US012655264B2

(12) United States Patent
Drewes et al.

(10) Patent No.: US 12,655,264 B2
(45) Date of Patent: Jun. 16, 2026

(54) REACTOR ARRANGEMENT AND METHOD FOR DECOMPOSING OBJECTS CONSISTING OF PLASTIC-BASED COMPOSITE MATERIALS

(71) Applicant: Hanseatic Rohr GmbH, Bargeshagen (DE)

(72) Inventors: Thomas Drewes, Admannhagen-Bargeshagen (DE); Karl Heinz Thiel, Admannhagen-Bargeshagen (DE)

(73) Assignee: HANSEATIC ROHR GMBH, Bargeshagen (DE)

( * ) Notice: Subject to any disclaimer, the term of this patent is extended or adjusted under 35 U.S.C. 154(b) by 657 days.

(21) Appl. No.: 18/033,909

(22) PCT Filed: Oct. 22, 2021

(86) PCT No.: PCT/EP2021/079343
§ 371 (c)(1),
(2) Date: Apr. 26, 2023

(87) PCT Pub. No.: WO2022/090079
PCT Pub. Date: May 5, 2022

(65) Prior Publication Data
US 2023/0399484 A1 Dec. 14, 2023

(30) Foreign Application Priority Data
Oct. 30, 2020 (DE) ..................... 10 2020 128 587.6

(51) Int. Cl.
*C08J 11/14* (2006.01)
*B01J 3/00* (2006.01)
(Continued)

(52) U.S. Cl.
CPC ............... *C08J 11/14* (2013.01); *B01J 3/008* (2013.01); *B01J 3/02* (2013.01); *B01J 19/0013* (2013.01);
(Continued)

(58) Field of Classification Search
CPC ... B01J 3/008; B01J 3/0042; B01J 3/02; B01J 19/0013; B01J 19/28; B01J 2219/00031;
(Continued)

(56) References Cited

U.S. PATENT DOCUMENTS

| 5,233,021 A | 8/1993 | Sikorski |
| 2003/0129103 A1 | 7/2003 | Sugiyama et al. |

FOREIGN PATENT DOCUMENTS

| DE | 102016105966 A1 | 10/2017 |
| DE | 102016105966 B4 | 4/2019 |

(Continued)

OTHER PUBLICATIONS

International Search Report and Written Opinion for PCT/EP2021/079343, dated Feb. 14, 2022; 18 pages.

(Continued)

*Primary Examiner* — Lessanework Seifu
(74) *Attorney, Agent, or Firm* — Fitch, Even, Tabin & Flannery LLP

(57) ABSTRACT

The invention relates to a reactor arrangement and to a method for decomposing objects of plastic-based composite materials into their individual constituents by way of a solvolysis using at least one reactor chamber in which the objects as exposed to a solvent in the supercritical state. The invention is characterized in that at least three pressure chambers located in series, a first load lock chamber, a reactor chamber adjoining the same, and a second load lock chamber adjoining the latter, which are each connected to each other via an actuatable partition which can be moved (Continued)

from an open position, in which two of the mutually adjacent pressure chambers are connected to each other, to a closed position, in which two of the mutually adjacent pressure chambers are fluidically, thermally and pressure-specifically isolated from each other. The reactor chamber is thermally coupled to a heating system and can be directly or indirectly fluidically connected via at least one first line to the first load lock chamber and can be connected to a first pressurizable feed line, via which solvent can be fed the reactor chamber.

18 Claims, 6 Drawing Sheets

(51) Int. Cl.

| | | |
|---|---|---|
| *B01J 3/02* | (2006.01) | |
| *B01J 19/00* | (2006.01) | |
| *B01J 19/28* | (2006.01) | |
| *B01J 3/04* | (2006.01) | |

(52) U.S. Cl.
CPC ................ *B01J 19/28* (2013.01); *B01J 3/042* (2013.01); *B01J 2219/00033* (2013.01); *B01J 2219/0004* (2013.01); *B01J 2219/00054* (2013.01); *B01J 2219/00162* (2013.01); *B01J 2219/00599* (2013.01); *B01J 2219/00601* (2013.01)

(58) Field of Classification Search
CPC ...... B01J 2219/00033; B01J 2219/0004; B01J 2219/187; B01J 2219/00162; B01J 2219/00601; C08J 11/14; B29B 17/02
See application file for complete search history.

(56) References Cited

FOREIGN PATENT DOCUMENTS

| EP | 3181221 | A1 | 6/2017 |
|---|---|---|---|
| JP | H1087872 | A | 4/1998 |
| JP | 3134095 | B2 | 12/2001 |
| JP | 2013203826 | A | 10/2013 |

OTHER PUBLICATIONS

Mrs. N Hofer—Instit et al: "Recycling With Water as an Environmentally Friendly Separation Technology—Overview of the State of the Art", Jan. 1, 2018 (Jan. 1, 2018-01-01), pp. 1-2, XP055884311, Found on the Internet: URL:https://www.ict.fraunhofer.de/content/dam/ict/de/documents/medien/ue/UE_WATT_Stand_der_Technik_V01-1_de.pdf; 33 pages.

REACTOR ARRANGEMENT AND METHOD FOR DECOMPOSING OBJECTS CONSISTING OF PLASTIC-BASED COMPOSITE MATERIALS

CROSS-REFERENCE TO RELATED APPLICATIONS

Reference is made to PCT/EP2021/079343 filed Oct. 22, 2021, and German Patent Application No. 10 2020 128 587.6 filed Oct. 30, 2020, which are incorporated herein by reference in their entirety.

BACKGROUND OF THE INVENTION

Field of the Invention

The invention relates to a reactor arrangement and to a method for decomposing objects of plastic-based composite materials into their individual constituents by way of a solvolysis using at least one reactor chamber in which the objects can be exposed to a solvent in the supercritical state.

Description of the Prior Art

When liquids such as water are heated under pressure, they ultimately, above their critical temperature and their critical pressure, reach the so-called supercritical state, which is characterized by a lower density, a much lower viscosity and much higher diffusion coefficients than true liquids. Water in the supercritical state also has an outstanding dissolving power. In order to bring water into the supercritical state, the water must have a temperature of at least $374.12°$ C. and be exposed to a pressure of at least $22.11V1$ Pa (221 bar). In addition to the particular solvent properties of water in the supercritical state, in particular the aspect that the solvent can be removed easily by reducing the pressure is of interesting technical significance.

These particular solvent properties of supercritical water are already used successfully to separate, work up and reuse, for example, hybrid materials or components, in particular composite-fiber materials based on engineering plastics.

Document DE 2016 105 966 B4 describes a method and a plant for recycling carbon-fiber-reinforced polymers using water as solvent in the supercritical state for the purpose of separating carbon fibers or carbon fiber mats from the polymer matrix surrounding same. Two similar reactors are used to carry out the recycling method, the operation of which is coordinated with each other such that they alternate with each other in the following manner. In a first reactor, which is already loaded with recycling material and filled with liquid solvent, the solvent has assumed the supercritical state after corresponding heating to a process temperature between $374.12°$ C. and $450°$ C. and under process pressures between 221.2 bar and 300 bar, in which supercritical state the solvent is able to dissolve the polymer matrix by way of chemical reaction and separate the fiber constituent, while the second reactor is loaded with recycling material and filled with solvent. Both reactors are coupled thermally via a heat recovery system, which uses the heat quantity of the first reactor, in which the recycling process is complete and which must be cooled down before removal of the purified material, to heat the second reactor. While the first reactor has been cooled and emptied and can thus be loaded with new recycling material and filled with fresh solvent, the purifying reaction process takes place in the second reactor after corresponding further heating and pressure increase to reach the supercritical state of the solvent.

The sequence of the above-explained operating principle of both reactors coordinated serially with each other can be continued continuously.

The fundamental usability of supercritical water to purify fiber-reinforced composite materials with a plastic polymer matrix can be found in Japanese documents JP 3134095 B2 and JPH 1087872 A.

U.S. Pat. No. 5,233,021 describes a method for extracting pure polymer components from a multi-component polymer textile structure in which the components have different melting temperatures. By use of a supercritical fluid, individual components are extracted from the multi-component structure by successively separating out individual components under different temperature and pressure conditions within individual process chambers.

US published patent application 2003/0129103 discloses a method for separating electrophotographic carrier compositions, which contain at least a carrier and a toner, wherein the carrier comprises a magnetic core material and a resin-like material which coats the carrier. For separation, the carrier is treated in water under supercritical, critical or subcritical conditions in order to separate magnetic core material and resinous material from each other. In this way, the separated magnetic core material can be collected.

Document JP 2013203826 A discloses a method and a system for producing a recycled fiber. The system comprises a reaction treatment container for decomposition treatment of a fiber-reinforced resin by using a supercritical or critical fluid.

SUMMARY OF THE INVENTION

The invention is based on the refining of a reactor arrangement and a method for decomposing objects of plastic-based composite materials into their individual constituents by way of a solvolysis, in which the objects can be exposed to a solvent in the supercritical state, such that the very energy-intensive process is to be usable on an industrial scale with a significantly lower energy expenditure than has previously been possible. In particular, it is desired to manage the large quantities of objects to be purified, as arise for example during dismantling of obsolete wind turbines in the form of rotor blade portions or fragments produced therefrom, for example in the form of bulk material.

The invention is based on the discovery that most of the outlay on energy lies in the production of the process parameters relating to temperature and pressure inside a reactor chamber necessary for the critical state of the solvent. It is therefore necessary to use the energy quantity needed for the chemical reaction process, which manifests in particular as thermal energy, as economically as possible in order to reduce as much as possible any occurring thermal energy losses, which occur as a result of the process while the reactor chamber is being filled, while the reaction process is being carried out, and also while the reactor chamber is being emptied. This applies particularly to the recycling of large quantities of recycling material, which must be processed on the industrial scale, in the shortest possible time with a high separation quality.

The reactor arrangement provides at least three pressure chambers which are arranged in series and are each connected or can be connected to each other via an actuatable partition. The partition can be moved individually from an open position, in which two mutually adjacent pressure chambers are connected to each other, to openly communicate fluidically with each other, into a closed position, in which the two mutually adjacent pressure chambers are fluidically, thermally and pressure-specifically isolated from each other.

The pressure chambers on the outside in the serial sequence in each case act as load lock chambers are further discussed with each having a reactor cover to be opened at the end, and closed so that the load lock chambers are in a fluid-tight, thermally insulating and pressurizable manner. The pressure chamber arranged between both load lock chambers via the partition in each case acts as a reactor chamber and is thermally coupled to a heating system.

The at least three pressure chambers arranged in a serial sequence are referred to below as first load lock chamber, reactor chamber and second load lock chamber. The objects to be treated chemically comprise plastic-based composite materials that are thus first introduced into the open reactor cover by use of a carrier into the first load lock chamber, in which they undergo a thermal pretreatment after the reactor cover is closed. The carrier holding the objects is then transferred from the first load lock chamber with the partition opening into the reactor chamber, in which the objects are exposed to the actual chemical reaction process. The chemically processed objects then pass into the second load lock chamber, in which they cool down before being ejected as extracts and residual constituents from the second load lock chamber at the end of the process.

Optionally, at least one further load lock chamber can be provided on one or both sides of the reactor chamber, in each case in a serial arrangement, but the rest of the description concentrates on the above-explained reactor arrangement comprising in each case three pressure chambers.

The reactor chamber, which, with the exception of the thermal coupling to a heating system, is otherwise advantageously identical in shape and size to the first and second load lock chambers, which are likewise advantageously identical, can be directly or indirectly fluidically connected to the first load lock chamber via at least one first line. Also, a first pressurizable feed line opens into the reactor chamber, via which feed line solvent can be fed into the reactor chamber as required.

Furthermore, the second load lock chamber can be directly or indirectly fluidically connected to the first load lock chamber via a second line.

Finally, a transfer means is provided which can transfer the carrier holding the objects from one pressure chamber to the adjacent pressure chamber in a force-assisted manner when the partition is moved into the open position. Although it is assumed below that the objects to be chemically decomposed are preferably arranged in a carrier for controlled transport through the reactor arrangement, it is likewise conceivable to omit the carrier and arrange the objects in the individual pressure chambers in the form of portioned bulk material, for example.

The first load lock chamber can be fluidically connected both to the reactor chamber, via the first line, and to the second load lock chamber via the second line, so that a considerable proportion of heat is used for preheating the objects to be chemically separated and the solvent present therein by controlled and on-demand diversion of solvent out of the heatable reactor chamber and also out of the second load lock chamber, from which heat must be dissipated for cooling purposes, into the first load lock chamber. Because the preheating of the objects to be chemically separated together with the carrier and of the solvent washing around the objects and carrier in the first load lock chamber takes place substantially on the basis of waste heat from the second load lock chamber and the reactor chamber, the energy input into the reactor chamber necessary for producing the supercritical state of the solvent within the reactor chamber is significantly lower than previously known comparable reactor technologies.

Moreover, the reactor arrangement according to the invention allows phased, unidirectional passage of the carriers charged with the objects to be decomposed from the first load lock chamber into the reactor chamber and from the reactor chamber into the second load lock chamber, from which the object components chemically decomposed into liquid and solid individual constituents can be removed together with the carrier. The serially phased process control resulting from the reactor arrangement allows fiber-reinforced plastic parts, especially in the form of planar components or component segments to bulk material, to be purified and chemically decomposed in large quantities and at a high throughput per unit time and is characterized according to the invention by the following method steps:

For the initial start of the method, a first carrier with objects to be chemically treated must be introduced through the open first load lock chamber and the reactor chamber connected openly thereto. Then, a second carrier, which is likewise charged with objects to be chemically treated, is introduced into the first load lock chamber. After the partition provided between the first load lock chamber and the reactor chamber has been closed, and the first load lock chamber has been closed by the reactor cover, solvent is fed into the reactor chamber and is heated in the reactor chamber to a predefinable temperature $T1$ of at most 320°. The pressure forming as a result of pressurized infeed of solvent and the heating taking place inside the reactor chamber is limited by controlled, overpressure-regulated discharge of heated solvent from the reactor chamber at a first pressure value $p1$, which is at most 250 bar, and preferably 150 bar so that the heated solvent at the temperature $T1$ and the pressure $p1$ is in a subcritical state.

Water is preferably used as the solvent.

The subcritical solvent discharged from the reactor chamber in a controlled overpressure-regulated manner is then fed into the first load lock chamber, as a result of which the objects held in the second carrier are preheated inside the load lock chamber. Optionally, additional solvent is also fed into the first load lock chamber under pressure.

Inside the reactor chamber, the heating process is continued until a temperature $T2$ of at least 374° C. and at most 500° C. and a pressure $p2$ of at least 230 bar and at most 250 bar are reached, at which the solvent water assumes a supercritical state. This state is maintained for a predefined process time $t$, within which the solvent in the supercritical state can dissolve the objects consisting of plastic-based composite materials into their constituents. In the process, the polymer plastic portions of the objects go into solution with the solvent, while the insoluble solid portions in the objects, for example fiber portions, remain as residual substances in the carrier.

During this, a temperature $T1$ of at most 320° and a load lock chamber internal pressure $p1$ of at most 250 bar is established inside the first load lock chamber by use of solvent optionally inflowing separately and by use of solvent originating from the reactor chamber. In this way, the objects situated in the first load lock chamber are subjected to an action of the solvent at the process temperature $T1$ and the process pressure $p1$ in the subcritical state, while the objects situated in the reactor chamber undergo chemical decomposition by use of the solvent in the supercritical state, which causes the preheating of the objects in the first load lock chamber and the chemical decomposition of the objects in the reactor chamber to take place simultaneously.

After the predefined process time t, which depends on how long until the objects in the reactor chamber are completely chemically separated or decomposed into individual components, the solvent in the supercritical state is transferred in a controlled manner out of the reactor chamber into the second load lock chamber via a line. Then, the second partition separating the reactor chamber from the second load lock chamber is opened, and the carrier together with the solid residual constituents of the objects is transferred in a force-assisted manner out of the reactor chamber into the second load lock chamber with the aid of a printable device. After the second partition between the reactor chamber and the second load lock chamber is closed, the solvent preheated inside the first load lock chamber is transferred in a controlled manner into the reaction chamber via a line. After this or chronologically overlapping with this, the first partition between the first load lock chamber and the reactor chamber is opened, as a result of which the second carrier with the preheated objects is transferred into the reactor chamber. After the first partition between the first load lock chamber and the reactor chamber is closed, the preheated solvent is brought into the supercritical state by heating inside the reactor chamber as in the preceding process step. After the first load lock chamber has been emptied, the reactor cover closing the first load lock chamber is opened and is charged with a further carrier with objects to be separated. After the first load lock chamber has been charged and closed, the filling and preheating in the first load lock chamber starts, as explained above.

After the solvent, which is mixed with dissolved polymers from plastic portions of the objects, has been discharged from the second load lock chamber, the first carrier holding the undissolved residual constituents can be removed from the second load lock chamber.

After the solvent has been discharged from the second load lock chamber and before the reactor cover is opened, the first carrier together with the object residual constituents is rinsed with fresh solvent, as a result of which the solvent is preheated owing to the residual heat present in the second load lock chamber and is made available to be fed back into the first load lock chamber.

After initial charging of an empty reactor arrangement, the method according to the invention comprises carrying out three simultaneously running process steps during normal operation, specifically thermally pretreating the objects to be treated reactively in the presence of a solvent in the subcritical state, chemically reactively dissolving or decomposing the objects in the presence of the solvent in the supercritical state inside the reactor chamber, and cooling and rinsing the object residual constituents and discharging used solvent from the second load lock chamber.

The advantage in terms of energy efficiency on which the method according to the invention and the reactor arrangement according to the solution are based lies in the utilization of the thermal waste heat, in particular from the reactor chamber and from the residual heat of the second load lock chamber for the purpose of heating the first load lock chamber after corresponding charging with objects by filling with solvent which is in the subcritical state at a process temperature of T1 and a process pressure of p1.

The process times or dwell times of the objects inside the first and second load lock chambers depend on the duration of the chemically reactive decomposition or dissolution process inside the reactor chamber. With a suitable selection of an object quantity per carrier, which is always the same, and the process volume inside the reactor chamber, the process time t for complete dissolution of the plastic portions of the objects is typically 2 hours, which is the carriers together with the objects being situated in the reactor arrangement to move on by one pressure chamber every two hours.

As a result of the above-explained operating principle of the reactor arrangement according to the invention, the temperature level inside the reactor chamber swings only between the process temperature T1, which results as a process end temperature during the heating-up phase inside the first load lock chamber, and the process temperature T2, at which the solvent is in the critical state. Depending on the choice of the upper process temperature T2, which can be between 374° C. and 500° C., the temperature inside the reactor chamber only has to be heated additionally from the lower process temperature of 320° within a range of at least 54° C. and at most 180° C. The energy input needed for this, which must be provided for every individual decomposition and dissolution process, is therefore significantly lower than for all previously known methods of the type in question. The arrangement according to the invention and also the method according to the invention which can be implemented therewith are explained in more detail below with reference to illustrated exemplary embodiments.

BRIEF DESCRIPTION OF THE DRAWINGS

The invention is described below by way of example using exemplary embodiments and with reference to the drawings, without any limitation of the general inventive concept. In the figures.

DETAILED DESCRIPTION OF THE INVENTION

Figure 1:
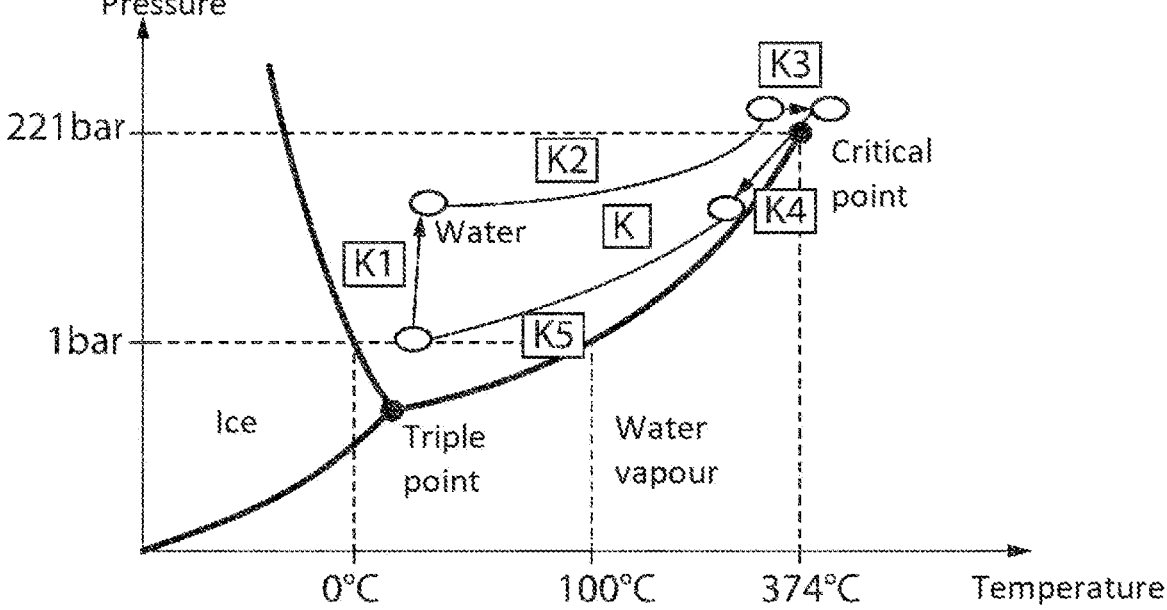
FIG. 1 shows a p/T graph to explain a cyclic process for the solvolysis.

FIG. 1 shows a thermodynamic pressure-temperature graph in which the phase transitions of water are shown as a function of pressure and temperature. In addition to the phase transitions which are known per se, the critical point for water should be noted. Upwards of a temperature of 374.12° C. and a pressure of 221.2 bar, there is no longer a defined state of matter for water, especially since the densities of the liquid and gas phases converge. It is precisely this critical point which must be reached and exceeded in order to achieve the desired effect of dissolving plastic-based fiber-reinforced composite materials.

The reactor arrangement according to the invention is assembled such that the thermodynamic cyclic process K shown in FIG. 1 can be implemented in the order of the cycle phases K1, K2, K3, K4 and K5 shown, with minimum energy input. Reference is made below to the cycle phases K1 to K5 shown in FIG. 1 in conjunction with the explanation of the method steps illustrated below.

Figures 2, 3:
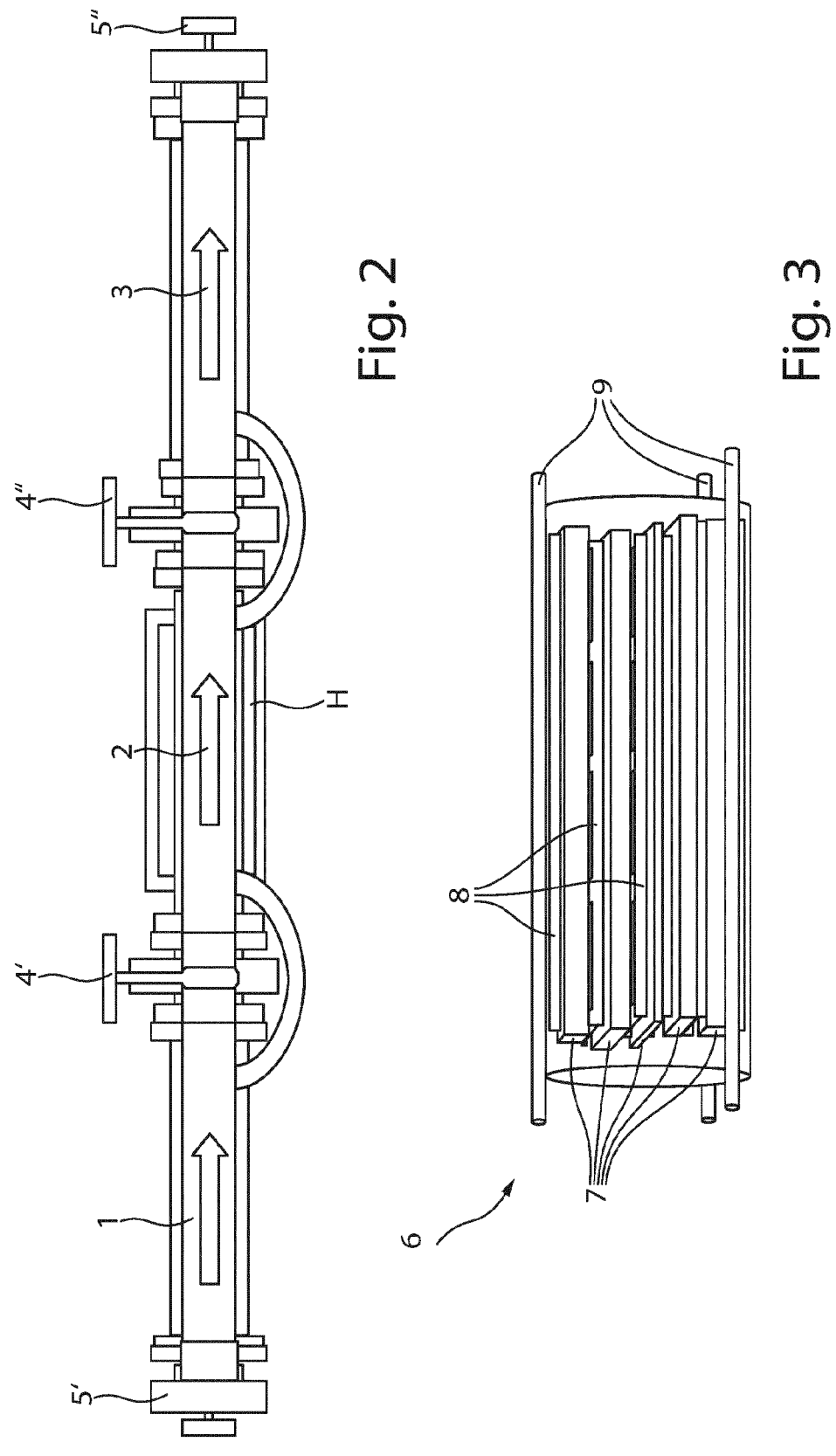
FIG. 2 shows an exemplary embodiment of a reactor arrangement formed according to the invention.
FIG. 3 shows a carrier with objects to be treated reactively arranged therein.

FIG. 2 shows a preferred embodiment of the reactor arrangement according to the invention, which is formed by three pressure chambers connected to each other in series, to form a first load lock chamber 1, a reactor chamber 2 and a second load lock chamber 3. All three pressure chambers 1, 2, 3 function as hollow tubes each having the same inner diameter with the tube lengths of which being preferably selected to be equal. A first partition 4' is introduced between the first load lock chamber 1 and the reactor chamber 2, and a second partition means 4" is located between the reactor chamber 2 and the second load lock chamber 3. Each partition has a slide valve, which ensures free passage between the two mutually adjacent pressure chambers when in an open state and separates the mutually adjacent pressure chambers in a fluid-tight, thermally stable and pressure-stable manner from each other when in a closed state, at temperatures up to at most 650° and pressures or pressure differences up to 400 bar. The first and second load lock chambers 1, 3 can each be closed at the end with a reactor cover 5', 5", so that the first and second load lock chambers 1, 3 can be closed off in a fluid-tight manner from the environment.

The reactor chamber 2 is also equipped with a heating system H, with which it is possible to heat the reactor chamber 2 to a process temperature of up to 500° C.

Correspondingly adapted to the inner diameter of the otherwise equally dimensioned pressure chambers 1, 2, 3, a carrier 6 is provided (See FIG. 3), which is suitably designed to receive objects 7 to be chemically dissolved, which preferably are fiber-reinforced composite materials in the form of fragments or segments. To this end, the carrier preferably has grid-like holders 8, which allow flow and temperature distribution around the objects 7 on all sides as far as possible inside the carrier 6. Sliding elements 9 are attached to the outside of the carrier 6 to allow the carrier 6 to be slid or pushed easily through the tubular inner contour of the individual pressure chambers 1, 2, 3, which each have an identical cross-sectional shape and size and pressure chamber longitudinal axes which are oriented coaxially with each other. This ensures that a carrier 6 introduced into the reactor chamber 2 via the first load lock chamber 1 can easily pass into the reactor chamber 2 and from there into the second load lock chamber 3, from which the carrier 6 can be removed again from the reactor arrangement.

Figure 4:
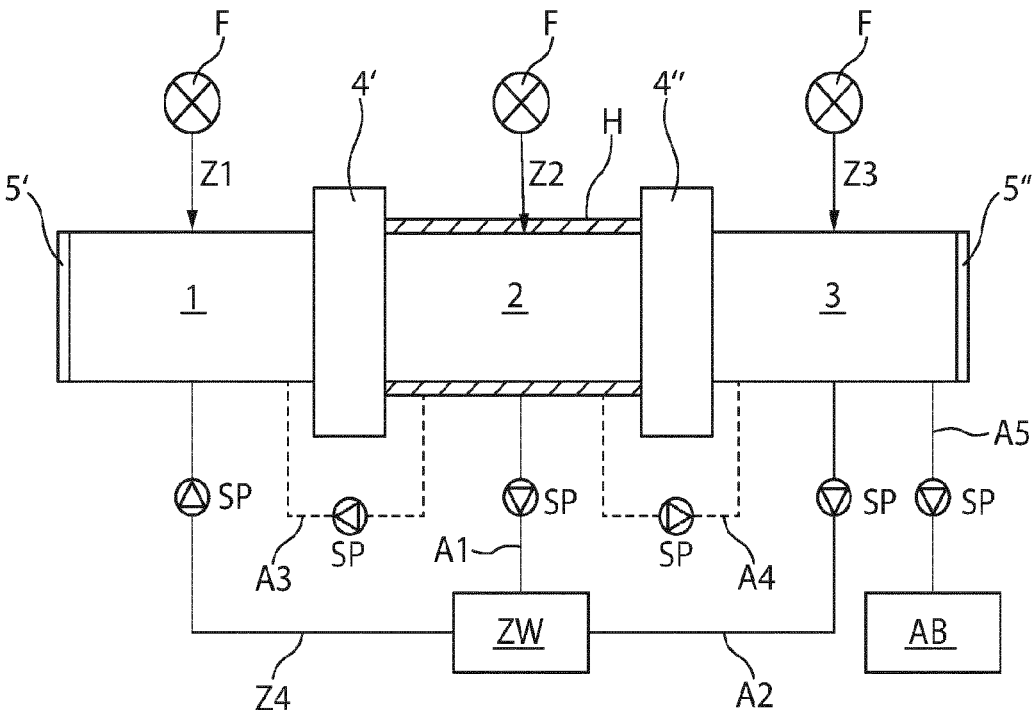
FIG. 4 shows an overview diagram.

FIG. 4 shows a schematic overview of all the components necessary for operating the reactor arrangement according to the invention. The first load lock chamber 1 is closably openly connected via a first partition 4' to the reactor chamber 2. The reactor chamber 2 is in turn closably openly connected to the second load lock chamber 3 with a second partition 4" which is otherwise identical to the first partition 4'. The first and second load lock chambers 1, 3 can each be closed in a fluid-tight manner at the end with a reactor cover 5', 5". The reactor chamber 2 is thermally coupled to a heating system H, which is provided as the sole heat source inside the entire reactor arrangement according to the invention. A feed line Z1 opens into the first load lock chamber 1, via which feed line solvent, preferably in the form of water, can be fed by a feed pump F, preferably in a pressure-regulated and in a controlled manner and as required into the first load lock chamber 1.

Similarly, feed lines Z2, Z3 open into the reactor chamber 2 and the second load lock chamber 3, respectively, via which the feed lines are provided solvent in the form of water, can be fed by respective feed pumps F, preferably in a pressure-regulated manner, as required into the reactor chamber 2 and the second load lock chamber 3, respectively.

In addition, a first line A1 exits from the reactor chamber 2, along which is attached a controllable check valve SP. The first line A1 opens into a buffer store ZW, which is preferably thermally insulated, in order to store hot solvent discharged from the reactor chamber 2 in a controlled manner by use of the check valve SP temporarily for further use without the discharged solvent undergoing significant cooling. The buffer store ZW is connected to the first load lock chamber 1 via a feed line Z4 along which a check valve SP is likewise positioned. In addition, a second line A2, which is connected to the second load lock chamber 3 includes a controllable check valve SP opening into the buffer store ZW.

In addition, the reactor chamber 2 is fluidically connected to the first load lock chamber 1 via a third line A3. A controllable check valve SP is likewise positioned along the third line A3. Solvent passes via the third line A3 as required out of the reactor chamber 2 directly into the first load lock chamber 1 in order in this way to limit an overpressure building up in the reactor chamber 2 without at least one delay and assisting the preheating of the solvent in the first load lock chamber. In addition, the third line A3 allows controlled transfer of the solvent preheated in the first load lock chamber 1 into the emptied reactor chamber 2, as is explained in more detail below.

In the same way, a fourth line A4, along which a controllable check valve SP is likewise arranged, is attached between the reactor chamber 2 and the second load lock chamber 3. The fourth line A4 is used to control transfer the supercritical solvent out of the reactor chamber into the second load lock chamber 2, as is likewise explained in more detail below.

Finally, a fifth line A5, which is connected to a collection container AB which includes a check valve SP, exits from the second load lock chamber 3.

Figure 5A:
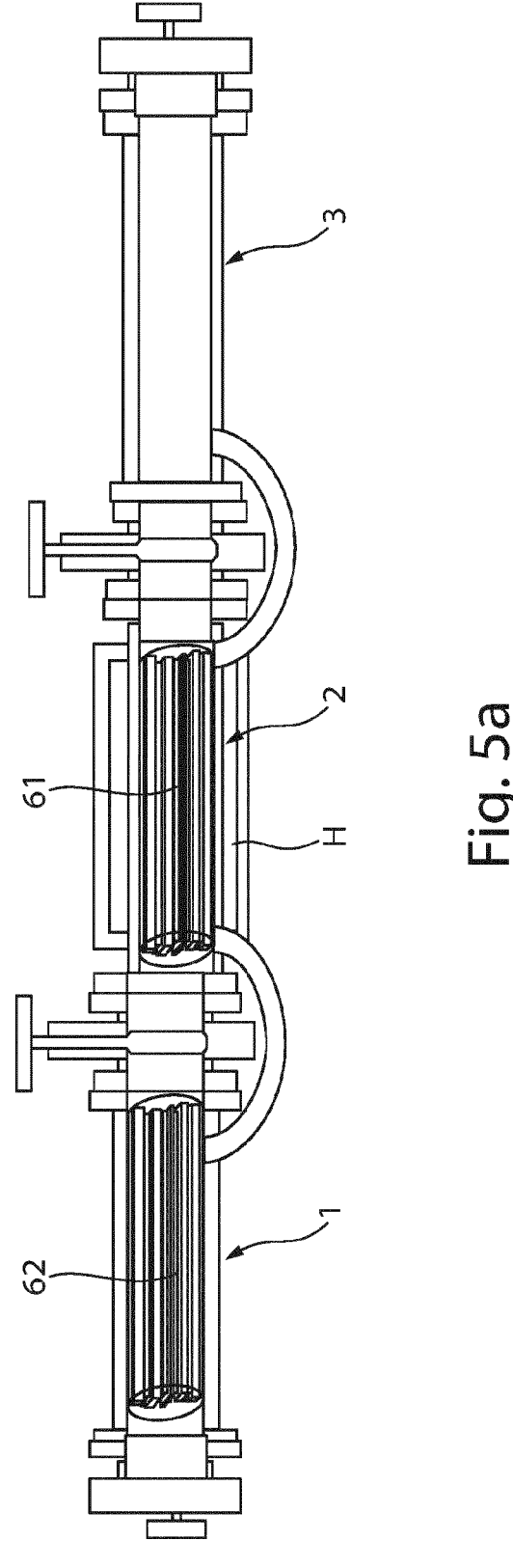
FIG. 5a-d show the individual process steps.

The above explained components interact to implement a process of decomposing objects of plastic-based composite materials in the following way:

Starting from a completely empty reactor arrangement as shown in FIG. 5a, a first carrier 61 is charged with objects to be treated reactively that are placed into the reactor chamber 2 via the first load lock chamber 1, which is open due to the open reactor cover 5' and the partition means 4', which has been positioned in the open position, between the first load lock chamber 1 and the reactor chamber 2. The partition 4' between the first load lock chamber 1 and the reactor chamber 2 is then closed. A second carrier 62 provided with corresponding objects is introduced into the first load lock chamber 1 with the reactor cover 5' open, and then the reactor cover 5' is connected in a fluid-tight manner to the first load lock chamber 1. This situation is illustrated in FIG. 5a.

Water acting as a solvent passes via the feed line Z2 shown in FIG. 4 into the reactor chamber 2, wherein the feed pump F provided along the feed line Z2 can implement a water pressure of approximately 150 bar inside the reactor chamber 2. While the water solvent is being fed into the reactor chamber 2, the heating process with the heating system H begins. As a result, the temperature inside the reactor chamber rises to approximately 300° C.

The internal pressure inside the reactor chamber 2 is limited to at most 250 bar, for example in a pressure-regulated manner, by reducing the water quantity via the first line A1 and the controllable check valve SP provided along the first line A1. The heated solvent flowing out of the reactor chamber 2 via the first line A1 is collected in a buffer container ZW and temporarily stored as heated solvent. By further heating and pressure regulation inside the reactor chamber 2, the solvent is brought into the supercritical state, that is with temperatures of 380° C. to 400° C. and process pressures between 230 and 250 bar inside the reactor chamber 2. In this state, the objects are decomposed into their constituents by solvolysis. With reference to the thermodynamic cyclic process according to FIG. 1, this section of the process corresponds to cycle phase K3, which lasts until all the fiber constituents are separated out of the plastic-based matrix surrounding them. The cycle phase K3 of the solvolysis is typically approximately two hours.

In parallel with this, the thermally preheated and temporarily stored solvent is let out of the buffer store ZW and into the first load lock chamber 1. The first load lock chamber 1 is additionally filled with solvent by the feed unit F in order to reach a pressure of approximately 150 bar. The temperature inside the first load lock chamber is preheated by the solvent temporarily stored in the buffer store ZW and optionally via the third line A3 with the solvent originating from the reactor chamber 2 to a temperature of 300° C. and an internal pressure of at most 250 bar. The cycle phases K1 and K2 are thus implemented inside the first load lock chamber 1 while the cycle phase K3, in which the objects to be purified are decomposed into their constituents, is taking place in the reactor chamber 2. See FIG. 5b.

After the chemical decomposition process taking place in the reactor chamber 2 is complete, the solvent, which is in the supercritical state and contains the dissolved polymer portions, is discharged in a controlled manner into the second load lock chamber 3 via the fourth line A4. To this end, the check valve SP along the fourth line A4 is opened in a controlled manner. Owing to the expansion and pressure reduction which take place as the supercritical solvent passes into the second load lock chamber 3, the solvent immediately assumes a subcritical state. Then, the second partition means 4" to the second load lock chamber 3 is opened, and the first carrier 61, charged with the chemically treated object residues, is transferred into the second load lock chamber 3.

To transfer the carrier 61 from the reactor chamber 2 into the second load lock chamber 3, a mechanism is provided which can transfer the carrier 61 in a force-assisted manner from the reactor chamber 2 into the second load lock chamber 3. The mechanism provided for this function can comprise an electromotive, hydraulic, pneumatic or magnetically assisted conveying mechanism, which conveys the carrier 61 in the longitudinal direction of the reactor chamber 2 and the second load lock chamber 3 connected openly to each other.

Figures 5B, 5C:
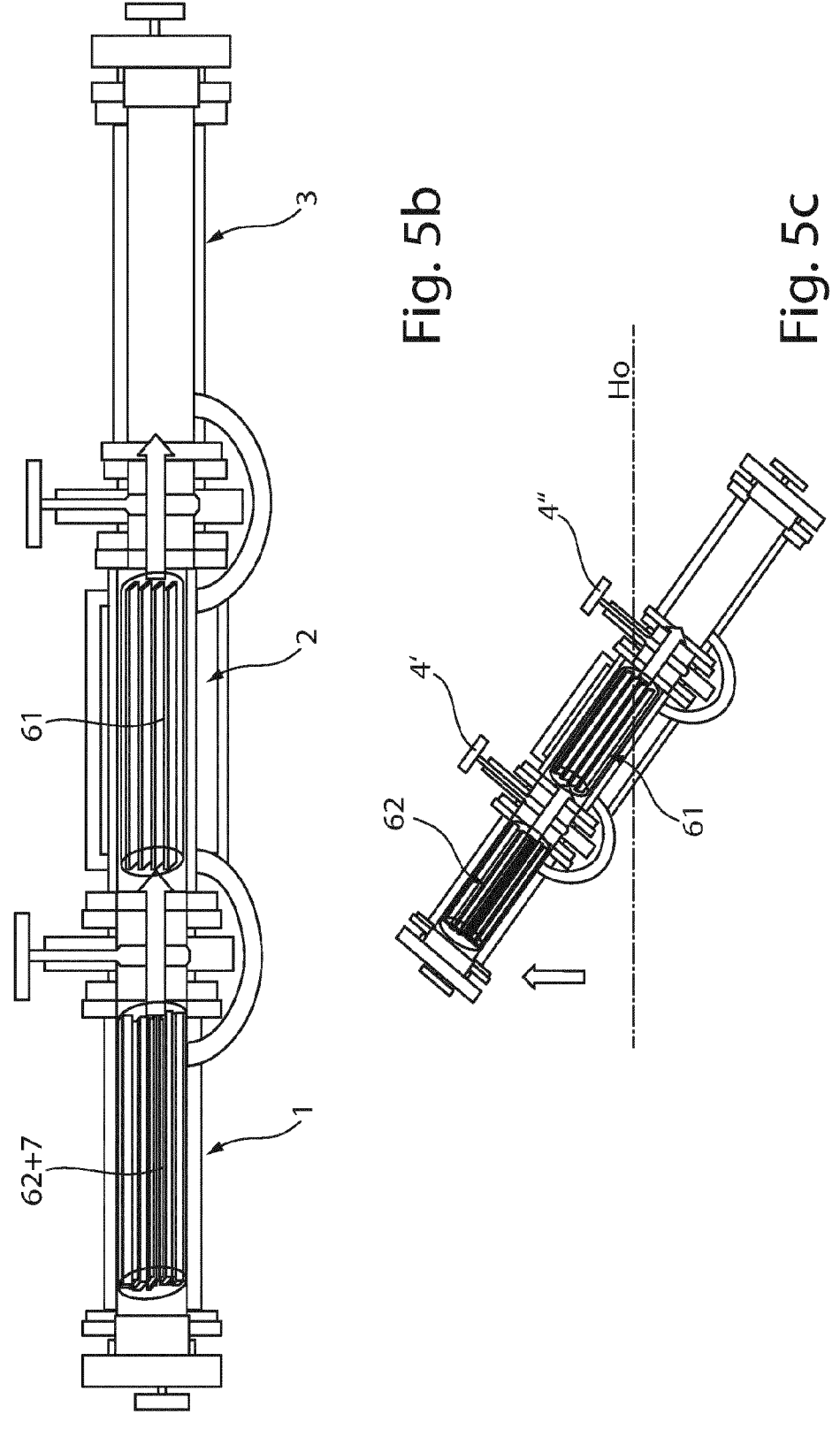

Alternatively, it is possible to tilt the entire reactor arrangement about the horizontal Ho, as illustrated in FIG. 5c, or even transfer it into the vertical. In this way, the carrier 61 situated in the reactor chamber 2 slides under the force of gravity into the second load lock chamber 3 when the second partition means 4" is open. Using this gravity-driven conveying technology, the objects could also be introduced inside the pressure chambers without carriers, for example in the form of loose bulk material. In this case, the bulk material falls right into the following pressure chamber. The solvent flows in front in a controlled manner via the fourth, open line A4 out of the reactor chamber 2 into the second load lock chamber 3 and expands in the process. Then, the second partition 4", closing the second load lock chamber 3, is transferred into the closed position, and the reactor chamber 2 is filled in a controlled manner with the preheated solvent from the first load lock chamber 1 via the open third line A3. The first partition 4' between the first load lock chamber 1 and the reactor chamber 2 is then opened. In this way, the second carrier 62 situated in the first load lock chamber passes into the reactor chamber 2 into the first load lock chamber 1. After corresponding closing of the first partition means 4' between the first load lock chamber 1 and the reactor chamber 2, the reactor arrangement is brought back into the original horizontal position Ho.

Figure 5D:
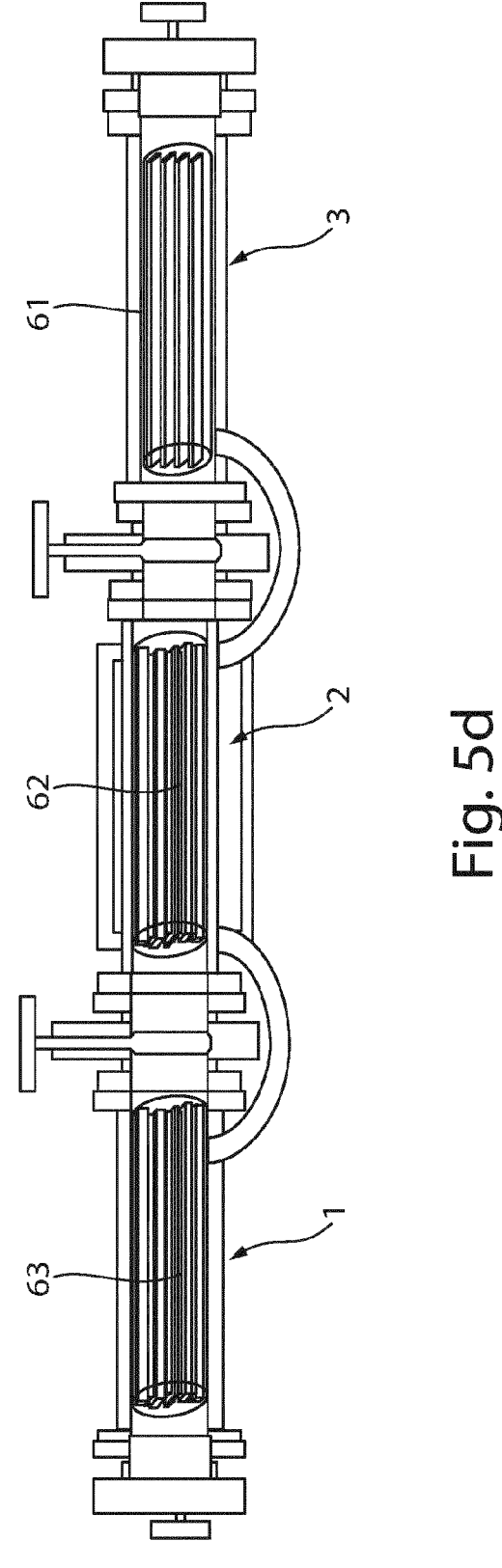

As a result of the rapid displacement of the first carrier 61 and the solvent out of the reactor chamber 2 into the right-hand load lock chamber 3 and as a result of the discharge of this solvent via the fifth line A5 into the collection container AB (See FIG. 4), a sudden drop in pressure and temperature takes place inside the second load lock chamber 3. This corresponds to the cycle phase K4 in the thermodynamic cyclic process K illustrated in FIG. 1. Then, the first carrier 61 introduced in the second load lock chamber 3 together with the fibrous object residual constituents are cooled by a fresh water rinse, which is implemented with the aid of the third feed line Z3 into the second load lock chamber 3. This cooling corresponds to the fifth cycle phase K5. The solvent introduced into the second load lock chamber 2 as a result of the fresh water rinse is preheated by thermal contact with the second load lock chamber 2 and the first carrier 61. As a result of which this solvent is transferred via the second line A2 into the buffer store ZW to fill the first load lock chamber 1, which is again charged with a third carrier 63 as shown in FIG. 5d with objects to be chemically treated.

After corresponding cooling and rinsing of the first carrier 61 situated in the second load lock chamber 3, the carrier can be removed from the second load lock chamber 3 after the reactor cover 5 has been opened. In this way, the insoluble object residues situated in the first carrier have undergone all the cycles of the solvolysis cycle shown in FIG. 1. At the same time, the subsequent solvolysis process corresponding to the third cycle phase K3 is already taking place inside the reactor chamber 2, the duration of the process of up to two hours corresponding to the time frames both for the dwell time of the objects inside the first load lock chamber 1, in which the cycle phases K1 and K2 take place, and the second load lock chamber 3, in which the cycle phases K4 and K5 take place as shown in FIG. 5d.

Thus, the reactor arrangement according to the invention can carry out the thermodynamic cyclic process K illustrated in FIG. 1 simultaneously, distributed between the first load lock chamber 1, the reactor chamber 2 and the second load lock chamber 3. In full-load operation, the process phases taking place in the individual pressure chambers change in a 2-hour rhythm.

In contrast to the three-chamber division illustrated, a first load lock chamber, reactor chamber, second load lock chamber, the reactor arrangement according to the invention can also be supplemented by further load lock chambers, in order to be able to implement the thermodynamic transitions with smaller differences in pressure and temperature. For example, two load lock chambers could be arranged in series upstream of the reactor chamber. Alternatively or in combination, two load lock chambers could also be arranged in series downstream of the reactor chamber.

LIST OF REFERENCE SIGNS

1 First load lock chamber
2 Reactor chamber
3 Second load lock chamber
4' First partition
4" Second partition
5', 5" Reactor cover
6, 61, 62, 63 Carrier
7 Objects
8 Holder
9 Sliding element H Heating system
K Thermodynamic cyclic process
K1, K2, K3, K4, K5 Cycle phases
A1, A2, A3, A4, A5 Line
F Feed pump
SP Check valve
AB Collection container
Z1, Z2, Z3, Z4 Feed line
Ho Horizontal
ZW Buffer container
The invention claimed is:

1. A reactor arrangement for decomposing objects comprising plastic-based composite materials into individual constituents by performing solvolysis in at least one reactor chamber in which the objects are exposed to a solvent heated to a supercritical state, comprising:
   at least three pressure chambers positioned in series comprising a first load lock chamber, a reactor chamber adjoining the first load lock chamber, a second load lock chamber adjoining the reactor chamber which are connected together by actuatable partitions which are movable from an open position, in which two of the three adjacent pressure chambers are connected to each other, to a closed position, in which the two connected pressure chambers are fluidically, thermally and pressure isolatable from each other;
   the reactor chamber being thermally coupled to a heating system which is fluidically connectable by at least one first line to the first load lock chamber and is connected to a first pressurizable feed line through which solvent is fed into the reactor chamber;
   the second load lock chamber includes a second line which is connectable to the first load lock chamber; and
   means for transferring objects and a carrier for holding objects and objects being forced to transfer from one of the pressure chambers to an adjacent pressure chamber when one of the actuatable partitions is in an open position.

2. The reactor arrangement according to claim 1, wherein:
   the pressure chambers are each tubular, have an identical cross-sectional shape and size and each have a chamber longitudinal axes positioned coaxially to each other.

3. The reactor arrangement according to claim 1, wherein:
   the partitions include a slide valve.

4. The reactor arrangement according to claim 1, comprising:
   a check valve positioned in the first line.

5. The reactor arrangement according to claim 4, wherein:
   the check valve comprises an overpressure valve.

6. The reactor arrangement according to claim 1, comprising:
   a container positioned in the first line.

7. The reactor arrangement according to claim 1, wherein:
   the first load lock chamber is connectable to a second pressurizable feed line through which the solvent is fed into the first load lock chamber.

8. The reactor arrangement according to claim 1, comprising:
   a third feed line for feeding the solvent which opens into the second load lock chamber.

9. The reactor arrangement according to claim 8, comprising:
   at least one of a controllable feed pump and at least one flow valve are positioned in the first, second and third feed lines.

10. The reactor arrangement according to claim 1, comprising:

a line connected to a collection container containing a check valve that opens into the second load lock chamber.

11. The reactor arrangement according to claim 1, comprising:
   means for a tilting the at least three pressure chambers from a horizontal position to a tilted position relative to the horizontal position so that the objects in the chamber slide under an effect of gravity out of one pressure chamber into a connected pressure chamber.

12. The reactor arrangement according to claim 1, comprising:
   an electromotively, hydraulically, pneumatically or magnetically assisted conveying mechanism for conveying the carrier along a longitudinal axis of the pressure chambers to two open pressure chambers.

13. The reactor arrangement according to claim 1, wherein:
   the first and second load lock chambers are closable to form a controllable fluid-tight and temperature controlled interior which is loadable and pressurizable at an end including an openable reactor cover.

14. A method for decomposing objects including plastic-based composite materials into individual constituents using a reactor arrangement according to claim 1, comprising steps of:
   a) charging the reactor chamber with a first carrier holding the objects and closing the reactor chamber;
   b) charging the first load lock chamber with a second carrier holding the objects and closing the first load lock chamber;
   c) feeding solvent into the reactor chamber and heating the reactor chamber to a temperature T1;
   d) limiting pressure in the reactor chamber to a first pressure by overpressure-regulated discharge of heated solvent from the reactor chamber to maintain the solvent in a subcritical state at the temperature T1 and a pressure P1;
   e) feeding the solvent discharged from the reactor chamber which is in the subcritical state into the first load lock chamber;
   f) increasing the pressure and temperature inside the reactor chamber to a temperature T2 and pressure P2, to cause the solvent to be at a supercritical state for a predefined process time t;
   g) transferring the first carrier holding the objects and the solvent out of the reactor chamber into the second load lock chamber after a processing time t is completed and discharging the solvent out of the second load lock chamber;
   h) transferring the second carrier holding the objects out of the first load lock chamber into the reactor chamber;
   i) charging the first load lock chamber using the first carrier holding the objects;
   j) removing the first carrier holding the objects from the second load lock chamber; and
   k) continuously carrying out method steps c) to j) so that further carriers holding objects are thermally treated to perform solvolysis in all of the pressure chambers.

15. The method according to claim 14, comprising:
   discharging the solvent in a subcritical state from the reactor chamber into a buffer storage; and
   feeding the subcritical solvent from the buffer storage into the first load lock chamber.

16. The method according to claim 14, wherein:
   in conjunction with step e), feeding solvent under pressure into the first load lock chamber.

17. The method according to claim 15, wherein:

after the solvent has been discharged from the second load lock chamber after method step g) is performed, rinsing the second load lock chamber together with the carrier holding the objects present in the second load lock chamber with fresh solvent, and after the second load lock chamber has been rinsed, transferring the heated solvent from the buffer storage.

18. The method according to claim 14, wherein solvolysis is performed with water as a solvent which is used with process parameters of:

$T1$=max. 320° C.;

$p1$=max. 250 bar;

$T2$=374° C. to 500° C.; and $p2$=230 bar to 250 bar.

\* \* \* \* \*